United States Patent [19]

Boyer et al.

[11] Patent Number: 5,299,191
[45] Date of Patent: Mar. 29, 1994

[54] METHOD AND A SYSTEM OF CONTROL OF ASYNCHRONOUS TIME COMMUNICATION OUTPUTS

[76] Inventors: Pierre Boyer, 3 Park an Denved, Kerligonan, 22300 Lannion; Yvon Rouaud, Goas Ar Stivel, Servel; Michel Servel, Le Rhu en Servel, both of F-22300 Lannion, all of France

[21] Appl. No.: 806,163

[22] Filed: Dec. 12, 1991

Related U.S. Application Data

[62] Division of Ser. No. 627,044, Dec. 13, 1990.

[51] Int. Cl.$^5$ .............................................. H04L 12/56
[52] U.S. Cl. ...................................... 370/60.1; 370/61
[58] Field of Search ................... 370/60, 60.1, 61, 68, 370/94.2, 100.1, 105.3, 108

[56] References Cited

U.S. PATENT DOCUMENTS

| | | | |
|---|---|---|---|
| 4,475,192 | 10/1984 | Fernow et al. | 370/60 |
| 4,941,141 | 7/1990 | Hayano | 370/100.1 |
| 5,130,979 | 7/1992 | Ohtawa | 370/67 |

FOREIGN PATENT DOCUMENTS

| | | |
|---|---|---|
| 0293315 | 11/1988 | European Pat. Off. . |
| 0329159 | 8/1989 | European Pat. Off. . |
| 0355243 | 2/1990 | European Pat. Off. . |
| 1427319 | 3/1976 | United Kingdom . |

OTHER PUBLICATIONS

J. Bauwens and T. Van Landegem, "Architecture of the Local Exchange in the Belgian Broadband Experiment", Revue HF, vol. 14, No. 5/6, Nov. 1989, Ophain Be, pp. 155-164.

M. G. H. Katevenis, "Fast Switching and Fair Control of Congested Flow in Broadband Networks," IEEE Journal on Selected Areas in Communications, vol. SAC-5, No. 8, Oct. 1987, pp. 1315-1326.

*Primary Examiner*—Douglas W. Olms
*Assistant Examiner*—Melvin Marcelo
*Attorney, Agent, or Firm*—Laff, Whitesel, Conte & Saret

[57] ABSTRACT

The invention is a method of controlling asynchronous time-division communications. Cells received from an in-coming time division multiplex system are delivered to an out-going asynchronous time division multiplex system. Each in-coming cell is stored in a buffer memory at an address that corresponds to its re-sending time. At the time when the next cell of a particular communication arrives, the number of previously stored cells for that particular communication, that are stored in the buffer memory, is compared with a maximal number assigned to the particular communication. If the first number exceeds the second number, the next in-coming cell is not re-sent. Besides the buffer memory, the system includes a status memory and an arithmetic and logic unit. The status memory is divided into zones, each zone having two sections. When the next cell is received, a first number of cells stored in the first section of the particular communication which were stored in the buffer memory and which have not yet been sent, is compared with the maximal number stored in the second zone. The arithmetic and logic unit makes the comparison and inhibits the re-sending of the next in-coming cell, if the first number exceeds the maximal number.

2 Claims, 9 Drawing Sheets

| tde | 8 BITS | 16 BITS | 8 BITS |

TIME OF LAST CELL ARRIVAL

| tse | 8 BITS | 16 BITS | 8 BITS |

TIME DEDUCED FROM tde+pm

| tdl | 8 BITS | 16 BITS | 8 BITS |

THEORETICAL TRANSMISSION OF LAST CELL

| t-pm | 8 BITS | 16 BITS | 8 BITS |

PRECEDING TIME PERIOD=PM

| t | 8 BITS | 16 BITS |

LOCAL TIME

| nm | 8 BITS | 16 BITS |

NUMBER OF WAITING CELLS

| p | 8 BITS | 16 BITS |

TIME WHEN IT IS CERTAIN THAT ALL CELLS HAVE BEEN SENT

| pm | 16 BITS | 8 BITS |

MINIMUM PERIOD FOR CELL SEPARATION

| dm | 16 BITS | 8 BITS |

MINIMUM DELAY

FIG. 2

| t1 + t2 | 1<br>b3<br>tdl>tde<br>Δ2 d 6 | 2<br>cl<br>t<tdl<br>Δ3 d 6 | 3<br>el et b2<br>t>p<br>et tdl=tde<br>Δ4 d 6 | 4<br>dl<br>N+1>NM<br>Δ5 d 6 | 5<br>b2 et f2<br>tdl = tde<br>t>tse<br>Δ6 | 6<br>b2 et fl<br>tdl = tde<br>tdl<t<tse | 7<br>c2 et e2<br>tdl<=t<=p |
|---|---|---|---|---|---|---|---|
| a1 | t | t | t | x | t | tse | tse |
| a2 | x | x | x | x | x | x | x |
| a3 | t-pm | t-pm | t-pm | x | t-pm | x | x |
| a4 | x | x | x | x | x | x | x |
| a5 | x | x | x | x | x | x | x |
| a6 | 1 | 1 | 1 | x | 1 | N+1 | N+1 |
| Adr1 | Add | Add | Add | x | Add | Add | Add |
| Adr2 | t | t | t | x | t | tse | tse |
| dispo | 1 | 1 | 1 | x | 1 | 1 | 1 |
| hte | t | t | t | x | t | tse | tse |
| be | 1 | 1 | 1 | x | 1 | 1 | 1 |

FIG. 7

| t3 + t4 | 1 b3 tdl>tde Δ2 à 5 | 2 cl t<tdl Δ3 à 5 | 3 el b2 t>p et tdl = tde | 4 c2 e2 tdl≤t≤p tdl ≠ tde b1 | 5 c2 e2 tdl≤t≤tse tdl=tde b2 | 6 c2 e2 tse<t<p tdl=tde b2 |
|---|---|---|---|---|---|---|
| a1 | t | t | t | x | x | t |
| a2 | x | x | x | x | x | x |
| a3 | t | t | t | tdle | tdle | t |
| a4 | x | x | x | x | x | x |
| a5 | x | x | x | x | x | x |
| a6 | 0 | 0 | 0 | N−1 | N−1 | 0 |
| Adr1 | t | t | t | t | t | t |
| Adr2 | x | x | x | x | x | x |
| dispo | 0 | 0 | 0 | 0 | 0 | 0 |
| hte | x | x | x | x | x | x |
| be | 0 | 0 | 0 | 0 | 0 | 0 |

FIG. 8

| t3 + t4 | 1 b3 tdl>tde Δ2 d 4 | 2 cl t<tdl Δ3 d 4 | 3 b2 tdl = tde tse<t≤p Δ5 | 4 b2 tdl = tde tdl≤t≤p | 5 c2 et e2 tdl<=t<=p |
|---|---|---|---|---|---|
| a1 | t | t | t | | |
| a2 | x | x | x | x | x |
| a3 | t | t | t | x | x |
| a4 | x | x | x | x | x |
| a5 | x | x | x | x | x |
| a6 | 0 | 0 | 0 | x | x |

FIG. 9

METHOD AND A SYSTEM OF CONTROL OF ASYNCHRONOUS TIME COMMUNICATION OUTPUTS

This application is a divisional application of Ser. No. 07/627,044, filed Dec. 13, 1990.

This invention concerns a method and a system of control of asynchronous time communication outputs by virtual circuits.

Systems of control of the flows of packets or of cells carried by asynchronous time multiplexes are already known. The forwarding of any outputs and the divisions of the same resources of transmission constitute the interest of asynchronous time technology. It will be recalled that an asynchronous time multiplex has the structure of that which is described in the document EP-A-108028. In such a multiplex, the data are transmitted by packets of the same length each preceded by a label of fixed length identifying the virtual circuit to which the packet belongs. In the following in order to conform with the designation now usual, there will be designated by "cell" the label followed by the packet. The asynchronous time multiplexing permits in particular of transmitting in a same support, that is to say, the asynchronous time multiplex, cells belonging to different virtual circuits. The maximum number of virtual circuits on a multiplex is determined by the length in bits of a part of the label which identifies each virtual circuit.

The allocation of the time multiplexes depends generally on statistics of the rates of activity of the different sources capable of having access there with the result that there is a non nil risk of losses of information by an over flowing of the queues due to instantaneous overloads. These losses must of course be minimized but the solution is not easy because the flows supplied by the different sources are of discontinuous character and are sporadic. Furthermore, malevolent terminals are capable of injecting into the network cells with a higher output than that which has been allotted to them at the time of the establishing of their communication.

The documents EP-A-293314 and EP-A-293315 already describe each of the methods and systems of control of flow of packets in particular those which are carried by asynchronous time multiplexes. The documents U.S. Pat. No. 4,475,192 and U.S. Pat. No. 4,611,322 likewise deal with traffic controls. On this subject one can also refer to the article headed "The Challenge of Multiprint Communications" by Jonathan S. Turner, 5th ITC Seminar, Lake Como, May 1987, chapter 5—Congestion Control. This document defines in particular the device known under the English name "leaky bucket". Generally speaking in these flow controls the excess cells are eliminated when the number of cells received exceed the quantity provided for at the time of establishing the communication, this number being evaluated on a time corresponding to the dispension of maximum admissible propagation time. This dispension of propagation time is currently evaluated for a very low associated rate of loss, in the order of $10^{-10}$.

These known methods, systems and devices satisfy well the conditions of the clipping of output, but if there is a burst of consecutive or almost consecutive cells belonging to the same virtual circuit, even if the number of cells in the burst does not exceed the number authorised during the measuring interval considered, the burst risks creating an instantaneous overload in the lower part of the time communication network. In fact, the duration of the bursts assimilable by the network is clearly below the amplitude of the dispension of propagation time expected. It should be noted that these bursts or "lumps" of cells may be produced, not only by the sources but also by the upper multiplexing of asynchronous time flows.

One object of the present invention consists in providing a method and a system which not only realises a control of the traffic by eliminating the excess cells but also by smoothing the above-mentioned bursts.

The present application is a division of the European Patent Application No. 90460052.5 (published under No. 0438009).

According to a characteristic of the invention, there is provided a method to control the flux of asynchronous time-division communications formed of cells carried by an in-coming time division multiplex to deliver an out-going asynchronous time division multiplex, each in-coming cell being stored in a buffer memory at an address that corresponds to its real re-sending time on the out-going time division multiplex, characterized in that it consists in comparing the number of cells of a same communication that are stored in the buffer memory and that have not yet been sent at the time of arrival of an in-coming cell pertaining to that mentioned communication, with a maximal number assigned to the communication and, in case the first number exceeds the second one, in not providing for the re-sending of that in-coming cell.

According to another characteristic, the means of execution comprise, besides the buffer memory, a status memory and an arithmetic and logic unit, the status memory being divided into zones, each zone bi-univocally corresponding to a communication transmitted by the in-coming asynchronous time division multiplex and comprising two sections, a first section in which there is stored the number of cells of the communication stored in the buffer memory and that have not yet been sent at the time of arrival of the in-coming cell, and a second section in which there is stored the maximal number assigned to the communication, the arithmetic and logic unit making the comparison between the first number and the second number, and inhibiting the re-sending of the in-coming cell, when the first number exceeds the second one.

The above mentioned characteristics of the invention will appear more clearly on reading the following description of one embodiment, the said description being made in relation to the attached drawings among which:

FIG. 1 a block diagram of a system according to the invention;

FIG. 2 shows structures of words corresponding to hours or intervals of time used in the system of FIG. 1;

FIGS. 7 to 9 show the tables of the logical divisions taken in the logical part of the unit of FIG. 1.

Figure 1:
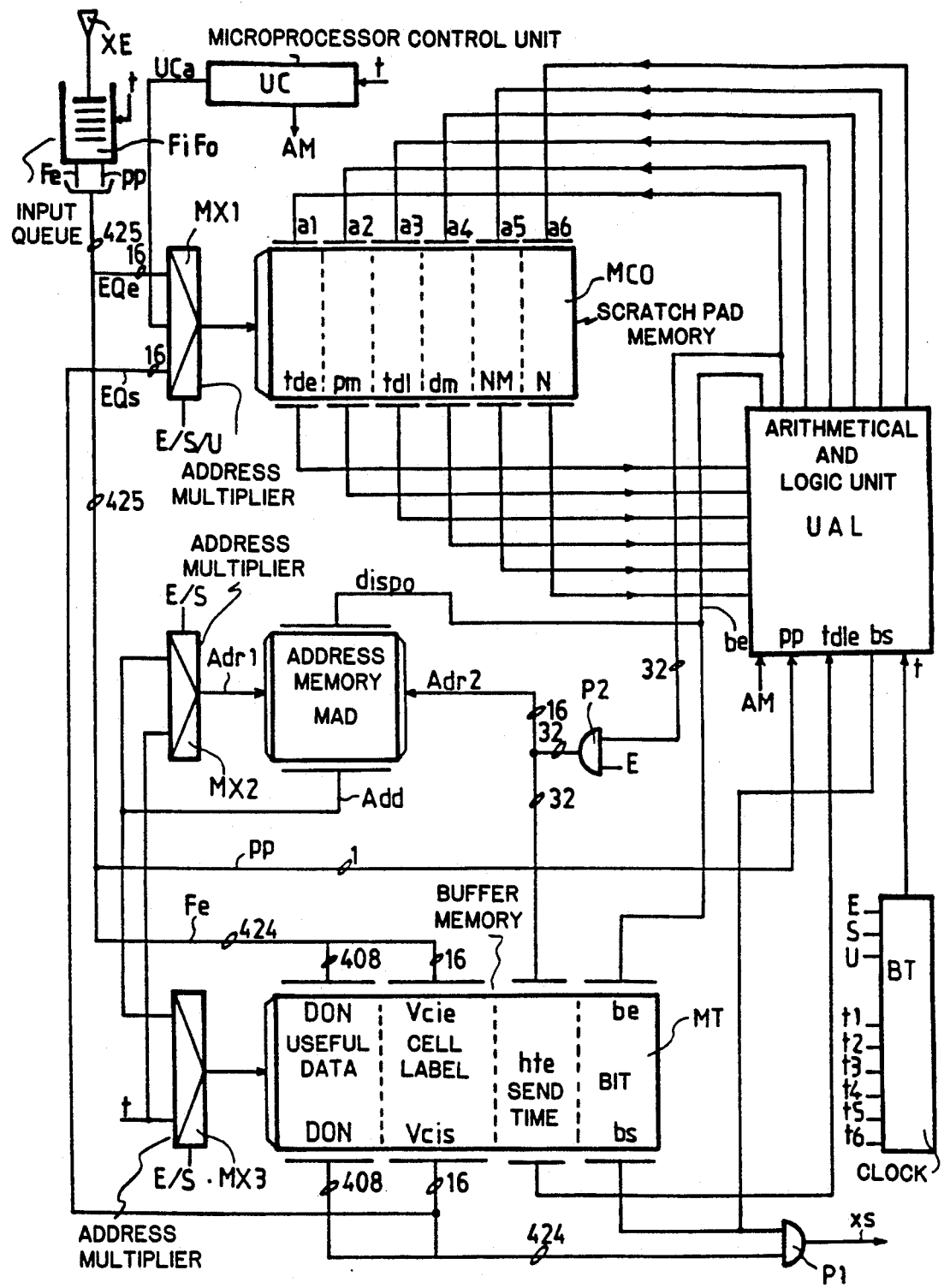

The system of FIG. 1 comprises an input queue FiFo, a slate memory MCO associated with an arithmetical and logical unit UAL and with an address multiplexer MIX 1, a memory of addresses available MAD associated with an address multiplexer MX2, a buffer memory MT associated with an address multiplexer MX3, gates AND P1 and P2, a time base BT and microprocessor control unit UC.

To the input of the queue memory FiFo is applied the incoming multiplex XE. The gate P1 supplies the outgoing or leaving multiplex XS.

In the embodiment described, the multiplex XE is an asynchronous time multiplex of the type which is described in the document EP-A-108028 but the packets of which, now called "cells" are assumed to have been put in parallel form with 424 bits. This size of 424 bits corresponds to that of a cell which has been adopted in June 1989 by CCITT. The memory FiFo is an alignment queue similar to that which is described in the document EP-A-113307 the role of which is to adapt the incoming input to the local clock t of the system of FIG. 1.

Each cell leaving the queue FiFo is therefore synchronous with the local clock and is presented on a bundle Fe of 424 wires, the first sixteen EQe of which transmit the first sixteen bits which constitute the label Vcie which identifies the virtual circuit which conveys the cell, that is to say, which identifies the communication concerned. The queue FiFo has also an output PP which carries a signal of the same name which indicates whether the interval of time entering is free or engaged. The signal PP is obtained as shown in FIG. 1 of the document EP-A-113307. The result is a bundle of 425 wires leaving the memory FiFo. The 425th wire carrying the signal PP and being connected to the input of the same name of the circuit UAL.

The state memory MCO is a live memory with a random access comprising as the maximum number of many zones as communications which the system can deal with. Each zone is divided into six sections respectively intended to memorise:
the theoretical time of emission of the last arrived cell tde,
the minimum theoretical period pm,
the theoretical time of emission of the last emitted cell tdl
minimum delay dm,
the number NM, and
the number N.

The memory MCO has six inputs a1 to a6, corresponding respectively to the six sections mentioned above. It comprises likewise six outputs bearing respectively the same designations as the sections. Finally, its address input is connected to the output of the multiplexes with three inputs MX1.

The first input of the multiplexer MX1 is connected to the bundle EQe bearing the label Vcie of the incoming cell, its second input is connected to the bundle EQs bearing the label VCis of the outgoing cell and its third input UCa is connected to a corresponding output of the control unit UC. The control input of the multiplexer mxl is connected to the Outputs E, S and U of the time base BT.

The time base BT supplies the local time t each elementary time of which corresponds to the reception of an incoming cell and to the emission of an outgoing cell. As FIG. 2 shows, the hour t serving to follow the chronology of the events is given on twenty-four bits a first part of heavy weight of which is composed of eight bits followed by a second part of lighter weight of sixteen bits. As will be seen later, the first part permits a marking of the long-term events and the second serves for the addressing of the memory MT and therefore marking the events in each operating cycle of the memory MT.

The time tde defined above is given on thirty-two bits a first part of eight bits of which and a second of sixteen bits, as for t, plus a third part of eight bits of lightweight constituting a decimal part the role of which will be seen later. In normal operation, the time tse is deduced from the theoretical time of emission of the proceeding cell of the same communication by adding to it the value pm which represents the theoretical minimum period of re-emission of the cells of the communication concerned. The hour tde is so-called theoretical because the actual time of emission of the cells concerned may differ therefrom given the possible conflicts between the theoretical times of emission of cells belonging to different communications.

The period pm is given on twenty-four bits the part of sixteen bits of which serving indirectly for the addressing of the memory MT and the decimal part of eight bits. The period pm corresponds to the minimum time which must theoretically separate the re-emission times of two consecutive cells in order to avoid the effect of "specks" and consequently to smooth the output of the cells.

The decimal part permits selecting any output which is not necessarily a submultiple of the output of the outgoing multiplex XS.

The theoretical time of emission of the last cell emitted tdl is coded on thirty-two bits, as tde, corresponds to the theoretical time at which the last cell of the communication concerned would have to be emitted even if its actual time of emission has been a little later.

The maximum delay dm is coded on twenty-four bits, as pm and corresponds to the maximum delay time admissible which a cell in the network can take, taking into account the dispension of propagation time admitted which has been mentioned in the preamble. In order to take into account this dispersion, smoothing the outputs up to this time valve dm is accepted. If, in consequence of consecutive bursts of cells in the same communication one cannot guarantee this delay, the cell concerned is destroyed. The delay dm may vary as a function of possible priorities between different communication cells.

The time base BT supplies in addition to the local time t and for each elementary time, six successive signals t1 to t6 which occupy together an elementary time. The times t1 and t2 are used for the corresponding treatment on the arrival of an incoming cell, the times t3 and t4 for the corresponding treatment on the emission of an outgoing cell and the times t5 and t6 for the treatment of the access to the memory MCO by the control unit UC. Furthermore, the output t1 and t2 are joined to supply the signal E, the outputs t3 and t4 to give the signal S and the outputs t5 and t6 to give the signal U. The signals E, S and U serve in particular to control the multiplexes MX1 to MX3.

The reading of the memories is effected at t1, t3 and t5 whilst the rewriting, after calculations, is effected at t2, t4 and t6.

The buffer memory MT is a live memory with random access comprising spaces the number of which will be defined in the following. Each space is divided into four sections respectively intended to memorize:
the field of useful data DON of a cell, the label Vcie of the corresponding cell,
the theoretical hour of emission tde of this cell, and
a bit b5 which when it is at "1" indicates that the space addressed in reading contains a useful cell to transmit.

The memory MT has four inputs corresponding respectively to the data DON, the label Vcie, the theoretical time of emission hte and the bit be. It comprises likewise four outputs bearing respectively the references DON, Vcis, tdse and bes. The outputs DON and Vcis are regrouped in a bundle of 424 wires connected respectively to the first inputs of 424 gates AND P1 the second inputs of which are connected to the output bes. The addressing input of the memory MT is connected to the output of the multiplexer MX3.

The first input of the multiplexer MX3 is connected to the output of the memory MAD and its second input receives the current time t of the time base BT. Its control input is connected to the outputs E and S of the base time BT.

The memory MAD is a live memory with random access comprising as many spaces as the memory MT, each space having a capacity of one bit and corresponding biunivocally to one space of the memory MT. It has an input dispo which is set at "1" or at "0" according to whether the memory MT is in writing or reading mode. It has an output Add. It comprises two address inputs Adr1 and Adr2. The input Adr1 is connected to the output of the multiplexer MX2 one input of which is connected to the output Add of the memory MAD and the second output of which receives the local time t of the time base BT. The control input of the multiplexer MX2 has its control input connected to the outputs E and S of the time base BT. The control input of the multiplexer MX2 has its control input connected to the outputs E and S of the time base BT. The address input Adr2 is connected to the Output of the gate P2.

The output Add of the memory MAD is connected to the first input of the multiplexer MX3.

In the memory MAD, one space contains an "O" to indicate that it is free and a "1" to indicate that is is engaged. The memory MAD supplies permanently to its output Add the address of a free space, this address being previously selected from the binary value of a field of sixteen bits extracted from the theoretical time of emission hte of the cell considered, that is to say, from the signal al which will be described later and which is applied to the first input of the gates P2. The second inputs of these gates P2 are connected to the output E of the time base BT which signifies that the input Adr2 of the memory MAD is only active during the treatment of an incoming cell and precisely to find an address Add of free space in the memory MT. A memory such as memory MAD is described in the document FR-A-2617602 with the title "Circuit for memorising state of availability of logical sources, such as memory cells and for establishing addresses of free resources". In practice the memory MAD comprises means for scanning the space which is designated by hte and when the space is not free, the following spaces and for stopping the scanning at the first free cell the address of which is then supplied by Add.

Figure 3:
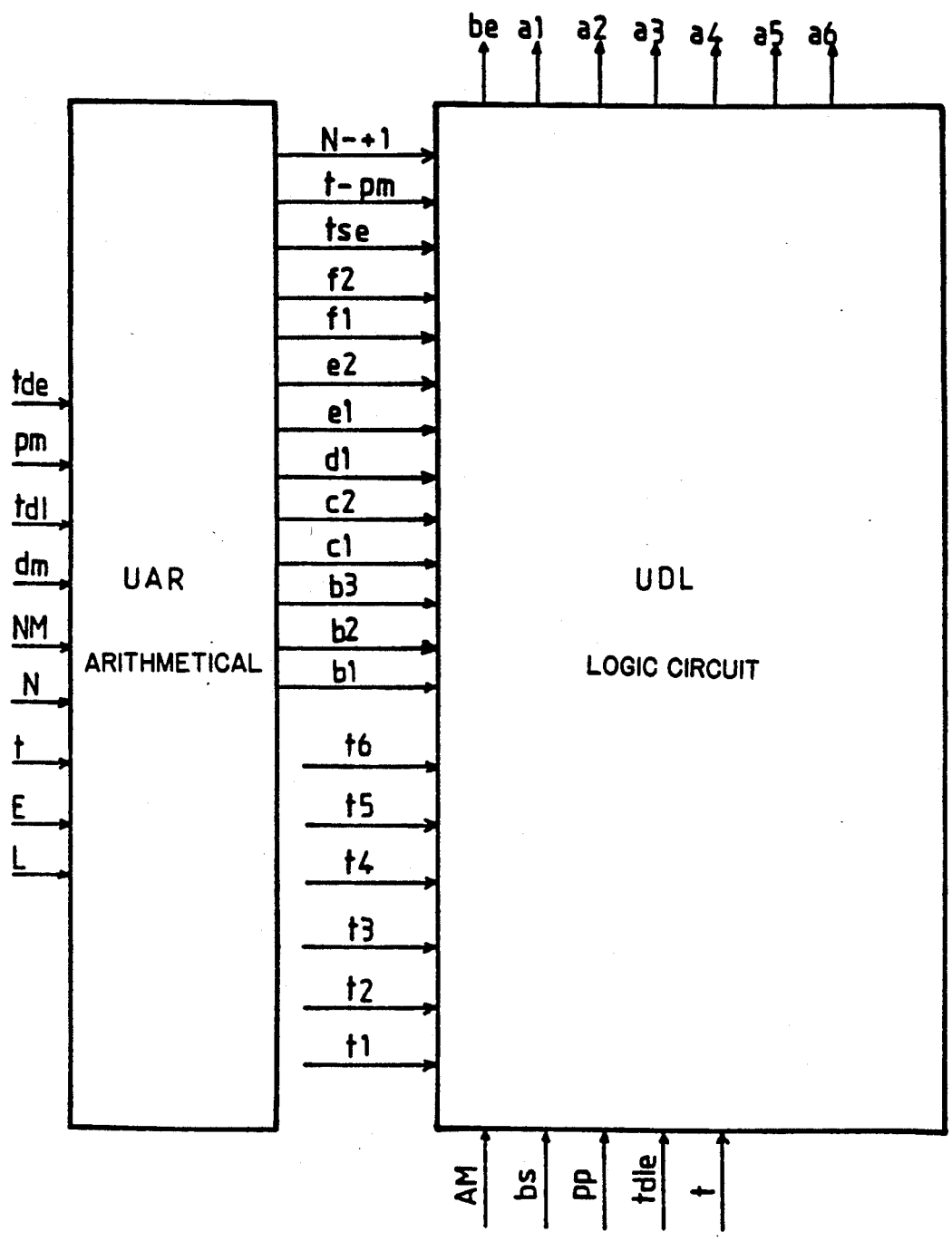
FIG. 3 is a block diagram of an arithmetical and logical unit used in the system of FIG. 1.
Figure 4:
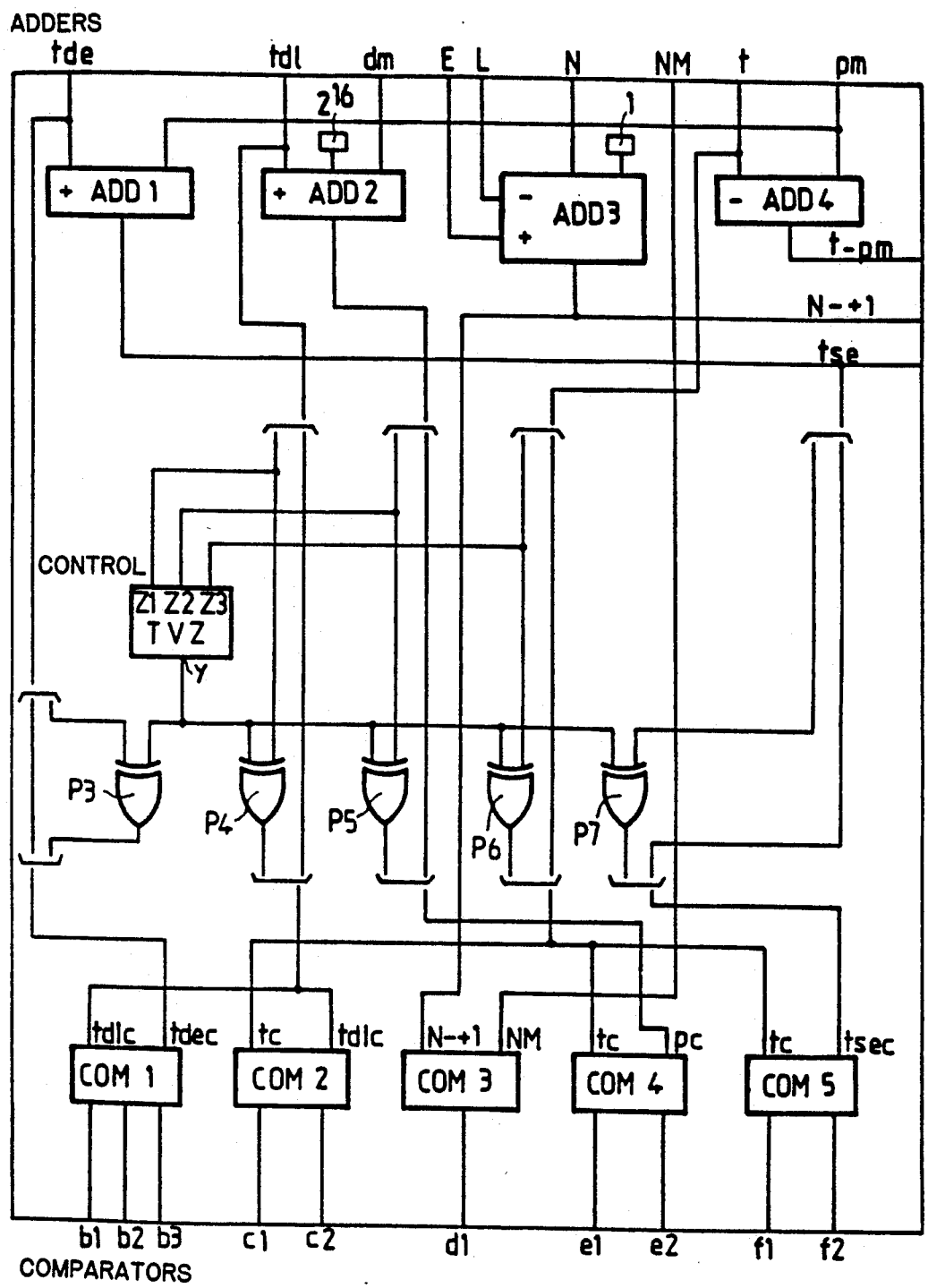
FIG. 4 is a diagram of the arithmetical part of the unit of FIG. 3.

The arithmetical and logical unit UAL associated with the memory MCO is represented in the block diagram of FIG. 3. It comprises an arithmetical part UAR and a logical decision part UDL. The part UDR, FIG. 4, comprises four adders ADD1 to ADD4, a proximity to zero test circuit TV2, five OR-inclusive gates P3 to P7 and five comparators COM1 to COM5.

The circuit UAR comprises the inputs tde, tdl, dm, E, L, N, NM, t and pm. It comprises likewise the outputs $t-pm$, $N+1$, tse, b1, b2, b3, c1, d1, e1, f1 and f2.

The circuit ADD1 is an arithmetical adder which has its two inputs connected respectively to the input tde and pm and its output to the output tse which supplies the time (tdm+pm).

The circuit ADD2 is an arithmetical adder which has three inputs, one of which is connected to the input tdl, the second to the input dm and the third receives permanently the value CMT which corresponds to the number of spaces in the memory MT. By way of example, the value may be $2^{16}$, that is 65536. The exponent 16 corresponds to the sixteen bits of the second part of t, FIG. 2. The eight bits of heavyweight t permit of not having zero value at each cycle of the buffer memory MT but a passage through zero only every $2^{24}$ elementary times of the time base BT which corresponds to a period T of the latter.

The output P of the adder ADD2 which supplies the value $(tdl+dm+2^{16})$ is connected indirectly through the gate P5 for its heavy weight bit, to the second input Pc of the comparator COM4.

The circuit ADD3 is an algebric adder which has two control inputs respectively connected to the inputs E and L and two inputs one of which is connected to the input N and the other receives permanently the value "1". Thus, when the input E is activated, the circuit ADD3 adds "1" to the value N whilst when the input L- is activated, it subtracts "1" from the value N. Thus, the output of the ADD3 supplies either $(N+1)$ or $(N-1)$ and is connected to the output $N-+1$ and to the first input of the comparator CDM3.

The circuit ADD4 is an arithmetical subtractor which has its two inputs connected respectively to the inputs t and pm. Its output supplies the value $(t-pm)$ and is connected to the output $t-pm$.

The circuit TVZ has three inputs z1 to z3 and one output Y. The inputs z1 to z3 are respectively connected to the heavy weight bit wires of the input tdl, the output P of the adder ADD2 and the input t, these wires likewise being respectively connected to the first inputs of the gates P4 to P6. The output Y is at "1" when, among the three heavy weight bits applied to its inputs, the binary value of one of them differs from those of the two others. The output Y is connected to the second inputs of the gates P4 to P6. Furthermore, the heavy weight bit wire of the input tde is connected to the first input of the gate P3 the second input of which is connected to the output Y of the circuit TVZ. Finally, the heavy weight bit wire of the output tse is connected to the first input of the gate P7 the second input of which is also connected to the output Y.

In the case where $Y=0$, the heavy weight bit of each of the values tde, tse, tdl, P and t is not changed in passing with its associated OR-exclusive gate. In the case where $Y=1$, the heavy weight bit changes value at the output of the gate P3 to P7 which leads, once it has been associated with the rest of the lightweight bits to have all the values in a zone not comprising the value zero of a complete cycle of the time base BT and therefore being able to compare them without ambiguity in the comparators COM1, COM2, COM4 and COM5 around the value T/2.

The comparator COM1 has its two inputs tdlc and tdec respectively connected to the outputs of the gates P4 and P3. If output b1 is activated when tdec is higher than tdlc, the output b2 is activated when tdle is equal to tdlc and the output b3 is activated when tdec is lower than tdlc.

The comparator COM2 has in input tc connected to the output of the gate P6 and an input tdlc connected to the output of the gate P4. Its output c1 is activated when tc is lower than tdlc and its output c2 when tc is equal to or higher than tdlc.

The comparator COM3 has its first input which receives $N-+1$ and its second input connected to the input NM. Its output d1 is activated when $N-+1$ is higher than NM.

The comparator COM4 has an input tc connected to the output of the gate P6 for the heavy weight bit and to the input t for the light weight bits and an input Pc connected to the output of the gate P5 for the heavy weight bit and the output P for the rest of the light weight bits. Its output c1 is activated when tc is higher than Pc and its output e2 is activated when tc is equal to or lower than Pc.

The comparator COM5 has an input tc connected in parallel on the input tc of the comparator COM4 and an input tsec connected to the output of the gate P7 for the heavy weight wire and to the output of the adder ADD1 for the rest of the lightweight bits. Its output f1 is activated when tc is lower than tsec which is a normal case of a first type whilst its output F2 is activated when tc is higher than tsec which is a normal case of a second type.

The output signal tse produced by the adder ADD1 corresponds to a time which is the sum of the theoretical time of emission of the preceding cell tde and of the minimum period pm. FIG. 2 shows that the time tse (tdepm) is, like tde coded on thirty-two bits one part of which is decimal. The signal $t-pm$ produced by the subtractor ADD4 corresponds to a time which precedes the current time t of a value equal to the minimum period pm. The time is also coded on thirty-two bits one part of which is decimal. It is used in the case of reinitialisation, as will be seen in the following in relation to FIG. 7. The signals NM and $N-+1$ are coded on twenty-four bits without decimal part. The signal NM corresponds to a number which represents, for a communication, the maximum number of waiting cells in the memory mT. The signal $N-+1$ is likewise a number which is compared with the number N-M in the comparator COM3. The signal P produced by the adder ADD2 corresponds to a time which is the sum of the time tdl, that is to say, the theoretical time of emission of the last cell emitted plus the maximum delay dm between two cells, plus the number of spaces of the memory MT. It is therefore certain that at the hour P all the cells waiting in the memory MT have been emitted, hence the interest of the compression of the current time t with the time P as will be seen further.

The signal b1 of the comparator COM1 is at "1" when tdec is higher than tdlc which means that on arrival of the cell forming part of a correspondence, the theoretical time of emission of the cell which has arrived just before is later than the theoretical time at which the last cell of the same communication has been emitted. It is a matter of a normal case. The signal b2 at "1" corresponds also to a normal case, that in which the two theoretical times are equal. On the other hand, the signal b3 at "1", expresses a faulty case. It is not possible for the theoretical time of emission of a cell belonging to a conversation to precede the theoretical time of a cell of the same conversation already emitted.

The signal c1 produced by the comparator COM2 at "1" means that tc is lower than tdlc. It is a question of a faulty case since tdlc corresponds to the time te at a cell already emitted. The output signal c2 at "1", corresponds to a normal case.

The output signal d1 of the comparator COM3 at "1" corresponds to the case where the memory would accept a number of cells of a conversation higher than that which has been agreed at the beginning of the conversation, the number agreed being NM. it is therefore also a faulty case.

The output signal e1 of the comparator COMA at "1" means that te is higher than PC. The signal c2 at "1" corresponds to a normal case.

The output signal f1 of the comparator at "1" expresses that tc is lower or equal to tsec which corresponds to a normal case of a first type as will be seen in the following. The output signal f2 at "1" expresses that tc is higher than tsec which corresponds to a normal case of a second type.

The signal f1 and f2 of the comparator COM5 corresponds to two types of normal cases as will be seen later.

Figure 5:
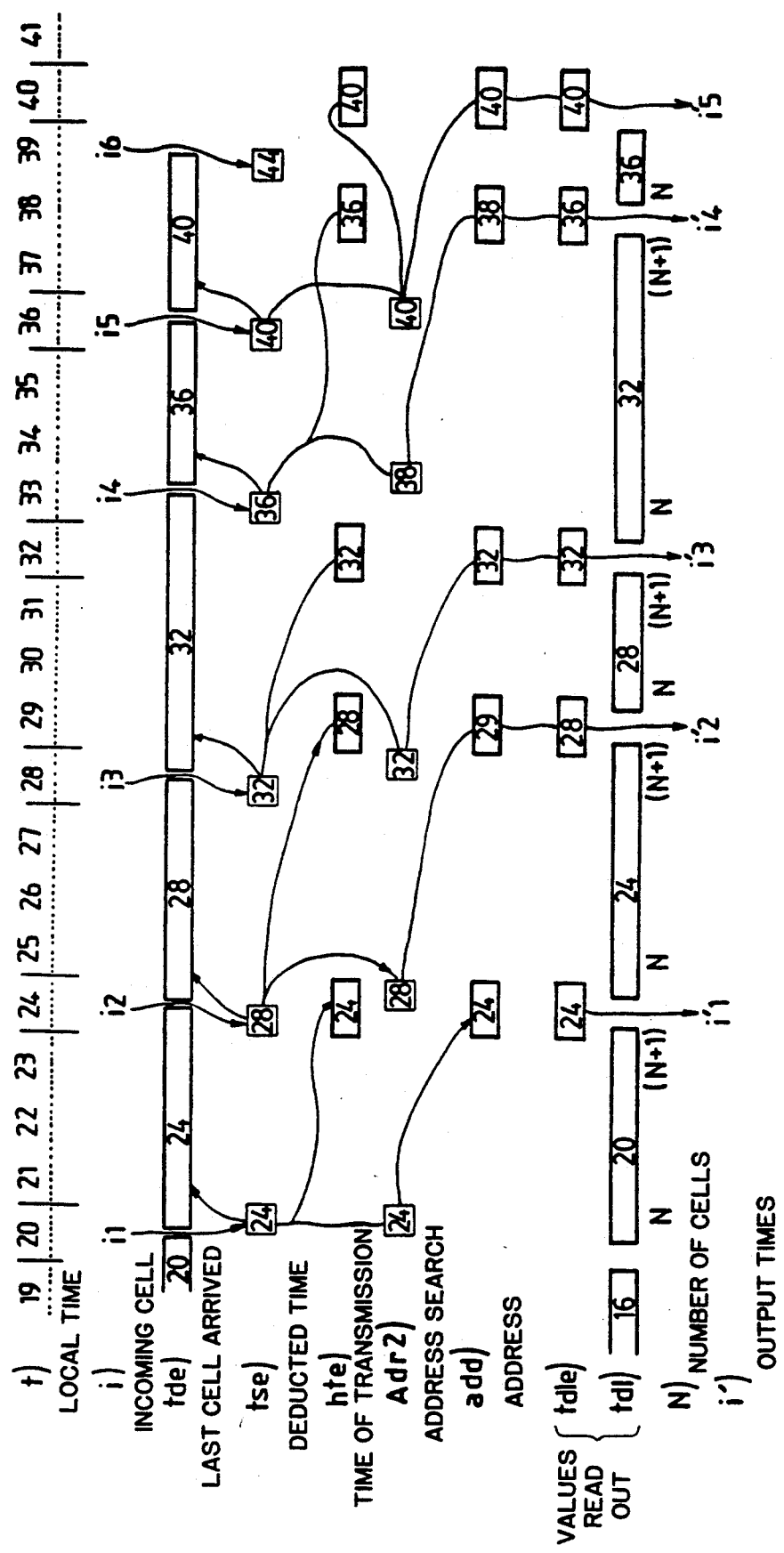
FIG. 5 shows time organigrams illustrating a case of operation of the system by the invention.
Figure 6:
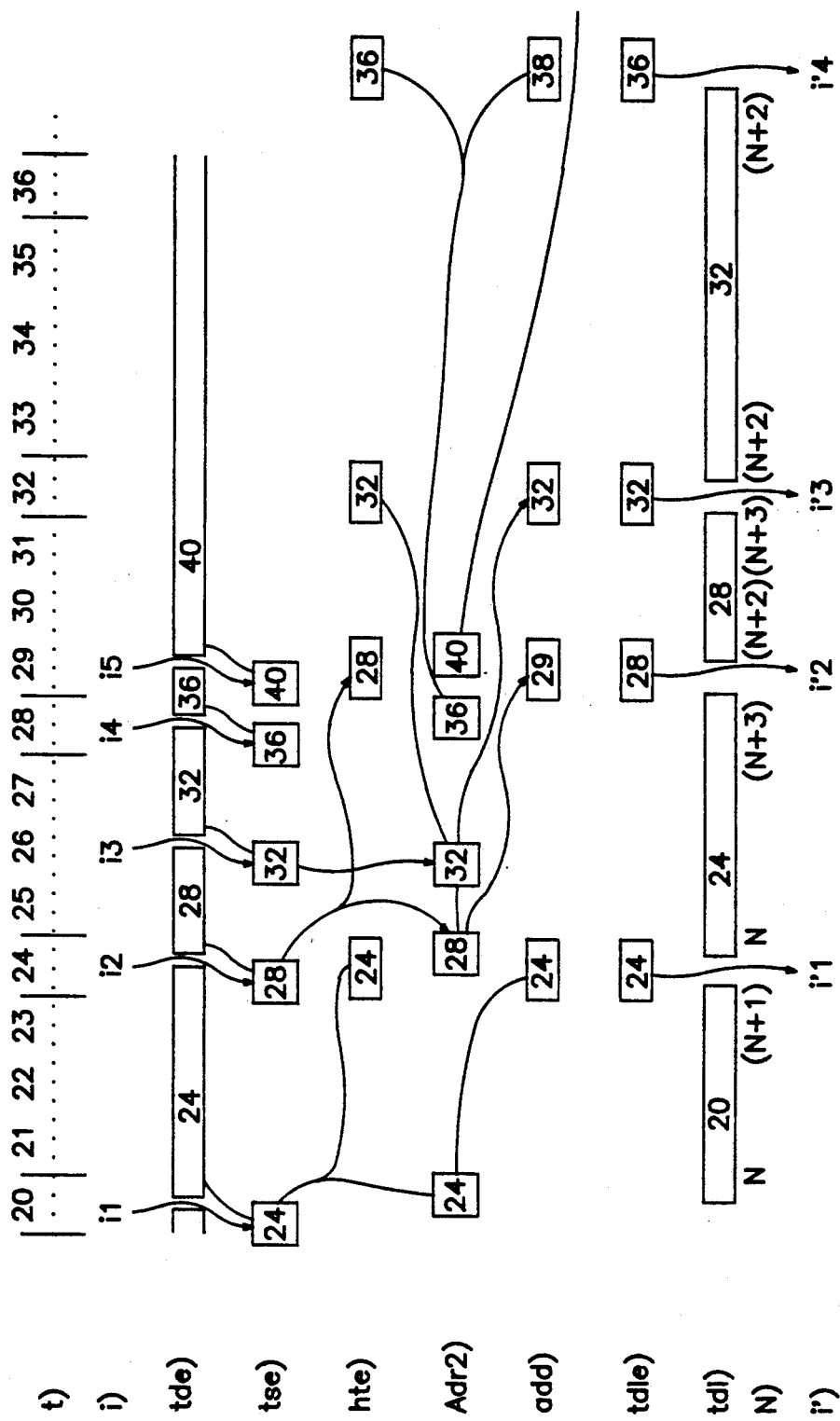
FIG. 6 shows also time organigrams illustrating another case of operation.

Before considering in detail how the logical decisions circuit UDL deals with the different cases as a function of the signals b1 to e2 which are applied to it we will illustrate in relation to FIGS. 5 and 6 two cases of current and normal operations, the value pm being four elementary times.

In the time diagrams of FIG. 5:
the line t) shows partially the unfolding of the local time t that is, here the elementary times t19 to t41,
the line i) indicates the incoming cells of the conversation i, that is, here i1 to i6 it being assumed that it is not a matter of a beginning of conversation,
the line tde) shows different values tde entered successively in the zone corresponding to the conversation i of the memory MCO,
the line tse) indicates the different values of tse at the corresponding output of the circuit UAR,
the line hte) indicates the successive values of hte,
the line Adr2) indicates the different initial addresses applied to the memory MAD in order that it may search for the address of an available following space in the memory MIT,
line add) indicates the addresses of the memory MT successively determined by the memory MAD, by noting that each value htc is also recorded at the same address of MT, although this value may be different from this address,
the line tdlc) indicates the successive values of tdle at each reading of the cell, the value of tdle being called to be memorized in the form of tdl in the zone corresponding to the conversation i in the memory, after treatment in the logical decisions circuit UDL.
the line tdl) indicates precisely the successive values of tdl,
the line N) indicates the successive numbers of cells of the conversation i which are in the memory MIT and
the line i') indicates the output times of the cells of the conversation i, that is, here i'1 to i'5 corresponding to i1 to i5.

In the time diagrams of FIG. 6 the same classes have been adopted.

In the case of FIG. 5, the cells i1 to i5 arrive at the input of the system of the invention by respecting the period Pm of four elementary times except for i4 which arrives with a time delay. The search for a free address in the memory MAD is immediate except for the memorization of the cell i2. Consequently the cells i'1 to i'5 leave shortly after spaced as the cells i1 to i5 are arriving. It will be remembered that the period pm is the minimum theoretical period of spacing between two re-emitted cells. In the case of FIG. 5 it is assumed that the entering cells respect practically this same period pm and it is found that normally the re-emitted cells also respect it.

In the case illustrated in FIG. 6, from the cell i2, the minimum period pm is no longer respected, the entering cells i3 to i5 arrive very close together but that then the following cells arrives clearly later. It will be noted however that the outgoing cells i1 to i4 are well spaced which confirms that the system of the invention effects a smoothing. FIG. 6 likewise shows that the number N may be increased rapidly in case of bursts. If the burst i3 to i5 had continued, the number N would have been able to exceed a maximum NM which would have entailed the elimination of the last cells of the burst.

The two cases illustrated in FIGS. 5 and 6 only constitute examples a normal cases which permit of determination of the faulty cases or other normal cases which will now be described in detail considering FIGS. 7 to 9.

As FIG. 3 shows, the inputs of the logical decisions circuit are: N−+1, t-pm, tse, b1, b3, c1, c2, d1, e1, e2, f1, f2, Am, bs, PP, tdle, t and t1 to t6. There will now be described successively the treatments carried out on the arrival of an incoming cell, at the emission of an outgoing cell and at the access of the central unit.

On the arrival of an incoming cell, this latter is treated at t1, then t2, FIG. 7. The zone of the memory MCO which corresponds to the communication i to which the incoming cell belongs, is addressed through the multiplexer MX1 commutated by the input E=t1+t2, by the label Veie of the cell. The state of the said zone of the memory MCO is read at t1 and its output signals applied to the circuit UAR which supplies the signals b1 to f2.

The different spaces indicated in the table of FIG. 7 represent the actions to be undertaken as a function of the events defined by the signals b1 to f2 (first line), associated with the conditions entered in the second line. The following cases will therefore be met:

1) b3 is at "1", whatever may be the other signals b2 to c2. Normally the time tde is always higher or equal to the time tdl since tdl corresponds to an emitted cell and tde to this same cell or to a following cell. It is therefore a faulty case. However, according to the system of the invention, the decision is taken to take into account the incoming cell. At t2, the signals al to a6 take the following values: t, that is to say, the current time x, t−pm, x, x, 1, x, indicating that the value already existing in the corresponding zone of MCO is unchanged. It will be seen in particular that at the time tdl the value t−pm is allocated in order that tdl may be different from tdc, which is useful for following cases and that the number N takes the value 1 to indicate that there is a cell of the communication i which has been memorised.

Furthermore, the sixteen bits of the signal al corresponding to the sixteen lightweight bits of t are applied by the gate P2 opened by the signal E to the input Adr2 of the memory MAD which goes to search for the address equal to or higher than t of a free space in the memory MT. The bundle of 32 wires of al, always through the gate P2 is extended towards the input hte of the memory MT. The wire be is at "1". The memory MT addressed by the multiplexes MX3 memorises the incoming cell, the time hte and the bit be in the corresponding space.

Finally, the memory MAD enters the bit "1", present at the input dispo connected to the wire be in the address space Add, the writing address being transmitted by the multiplexes MX2 controlled by E.

2) c1 is at "1", whatever may be the signals e1, b2, d1, c2 and e2.

This case cannot normally be produced and it is therefore a faulty case. It is decided to take the incoming cell into account and the same actions as at 1) above are taken.

3) e1 and b2 are at "1" whatever may be the signals d1, b2, c2 and e2.

This case signifies that at the end of the time P which is the sum of td1, dm and a reading cycle of the memory MT, that is $2^{16}$ in the example described, one is certain that all the cells of the communication i waiting in the memory MT have been read, if a new cell of this communication is not presented very recently. It is decided to take the incoming cell into account and the actions are the same as at 1) above.

4) d1 is at "1", whatever may be b2, c2 and e2.

At t1, on reading of the zone of the memory MCO, it appears that the number N- of cells of the communication i waiting in the memory MT is higher than NM, that is to say, higher than the number agreed at the time of the establishing of the communication i. The decision is taken not to write the incoming cell which is eliminated, the already existing data in the corresponding zone of the memory MCO being unchanged.

5) b2 and f2 are at "1" whatever may be c2 and e2.

This case corresponds to an absence of cell to be emitted for the conununication i. The incoming cell is taken into account and the actions are the same as at 1) above.

It is to be noted that this case corresponds to the initial case after establishment of the communication i.

6) b2 and f1 are at "1" whatever may be c2 and e2.

This is a normal case of operation of the second type. The incoming cell will be taken into account. At t2, the value of tse will become the new time tde and through al and the gates P2 will address the input Adr2 of the memory MAD and the end of the actions will be the same as that of the case 7) below.

Furthermore, the value of N will be increased by one unit.

7) c2 and e2 are at "1".

It is a normal case of operation of the first type. The entering cell will be taken into account. At t2, the value of tse will become the new hour tde and through al and the gates P2 will address the input Adr2 of the memory MAD. The control of a2 to a5 are unchanged. The value of N will be increased by one unit and arranged at a6.

On the emission of an outgoing cell, the zone of the memory MCO which corresponds to the communication i to which the outgoing cell belongs is addressed through the multiplexer MX1 commutated by the input S=t3+t4, by the label vcis of the cell which is supplied by the memory MT. The state of the said zone of the memory MCO is read at t3 and its output signals applied to the circuit UAR which supplies the signals b1 to f2.

It is important to note that one space of the memory MT therefore a cell can only be read if the bit be which is associated is at "1".

The different spaces indicated in the table of FIG. 8 represent the actions to be undertaken as a function of the events defined by the signals b1 to f2 (first line), associated with the conditions entered in the second line. The following cases are therefore met:

1) b3 is at "1", whatever may be c1, e1, b2, c2 and e2.
This case corresponds to a faulty case as on the arrival of an incoming cell and for the same reasons. To the times tde and td1 is allotted the value of the current time t and N is set to "0", be to "0", the other fields pm, dm and NM of the space being unchanged.

2) c1 is at "1", whatever may be e1 and b2, c2 and e2.
For the same reasons as at the time of the arrival of an incoming cell it is a question of a faulty case and the actions taken are the same as at 1) above.

3) e1 and b2 are at "1".
It is a matter of an abnormal case. In fact, since the time tde is equal to the time td1 there is no longer a cell of the communication awaiting to be emitted. Now, the addressing of the memory MCO is effected by the label Vcis of the cell in course of reading in the memory MT. Furthermore, the time t higher than P indicates that since the last cell emitted there has passed a little more than one cycle of reading of the buffer memory MT. That confirms that all the cells will have been read. The same actions as at 1) above are effected.

It is to be noted that if e1 is at "1", but b2 at "0" that signifies that the last incoming cell has arrived very recently. It is necessary then to emit as below at 4).

4) c2 and e2 are at "1", and b1 at "1".
It is a matter of a normal case of reading outgoing cell for emission. The time tdle supplied by the memory MT is used to remit up to date through a3 the old value of the time tdl in the corresponding zone of the memory MCO. Furthermore, through a6, the number N is decreased since the adder ADD3 of the circuit UAR has operated as subtractor. Through the multiplex MX2 controlled by S, the memory MAD is addressed by the current time t and the wire be sets the corresponding space of the memory MAD to "0" which signifies this space becomes free again. Finally, the wire be sets also to "0" the corresponding bit of the memory MT. The other fields of the zone of the memory MCO remain unchanged.

5) c2 and e2 are at "1", and b2 and f1 at "1".
It is a matter of a normal case and the same actions as at 4) above are taken.

6) c2 and e2 are at "1", and f2 and b2 at "1".
It is a matter of a faulty case since one cell is read and there are theoretically no more. The same actions are therefore taken as at 1) above.

For the access of the central unit UC to the memory MCO the multiplexer MX1 is connected by the signal U=t5+t6 and the central unit UC supplies itself the address UC of the zone which it will analyse. The state of the selected zone is read at t5 and its output signals applied to the unit UAR. At t6 one re-writes in the zone the data resulting from the calculations and logical decisions leaving the unit UDL. In the operation of the system concerned by the invention, the unit UC does not intervene on the memories MAD and MT. The access of the central unit UC to the memory MCO corresponds to several functions: putting up to honary date and the initialisation of a communication. The different spaces indicated in the table of FIG. 9 represent the actions to be undertaken for putting up to honary date as a function of the events defined by the signals b3, c1, b2 and c2 and e2 (first line) associated with the conditions entered in the second line. The following cases are therefore met:

1) b3 is at "1", whatever the state of c1, b2, c2 and e2.
It is a matter of a faulty case because the time tdi cannot exceed the time tde. One writes in the zone concerned values of tde and of tdi equal to the current hour t and one gives to the number N the value "0", the other fields pm, dm and NM being unchanged.

2) c1 is at "1" whatever the state of b2 and c2 and e2.
It is also a matter of a faulty case and the same actions as at 1) above are taken.

3) b2 is at "1", whatever may be c2 and e2.
It is a matter of the normal case of setting at the time with no cell awaiting emission for the communication considered. In fact, the communication has not been active for a certain time and the honary values of tde and of tdi present in the zone of the communication considered are due either to a preceding activity or to a preceding setting to the time by the central unit UC. The actions taken are the same as at 1) above.

4) b2 and f2 are at "1".
It is a normal case and no change in the zone fields is undertaken.

5) c2 and e2 are at "1".
It is a normal case and no change in the zone fields is undertaken.

In the second function the central unit UC also intervenes in the memory MCO either in order to initialise the latter or to establish a new communication or for bringing up to date. In this case the address UCa comprises a supplementary address bit of heavier weight set at "1" to differentiate this function from that of a simple bringing up to honary date. Consequently, independently of the calculations and decisions in the unit UAL, the central unit UC has access to the output wires al to a6 through the liaison AM. The six sections of the zone considered are those directly positioned. It is to be noted that in this case the times tde and tdl take the value of the current time t.

The bringing up to date of the memory MCO by the central unit UC takes place cyclically. The central unit scans the whole memory MCO at least in a time lower than T/2 where T corresponds as has already been mentioned, to one cycle of the time base BT. Thus, the central unit UC maintains all the values effected to a communication in proximity to the exact time t supplied by the time base BT so that all these times are always distant from one another by a value lower then T/2.

In this manner, if the heavy weight of any one of the time differs for a communication, from the heavy weight of another time, the assembly of these times are in the vicinity of the passage of the time base BT to zero. It is suitable, in this case, to effect the comparison of the times by adding the value T/2 to all times before comparison, they will be found in the vicinity of T/2 and the chronological order will be respected in the comparisons. It is this addition which is effected or not by the circuit TVZ and the gates P3 to P7, FIG. 3.

The system may be simplified by taking an upper margin for the calculation of the value P. One can only effect bringing up to date if N=O when t is higher than tde. In fact, if N is different from zero the bringing up to date takes place permanently since the communication is active.

If t is lower than tde one falls into the faulty case of not bringing to "0" through the central unit or others and the bringing up to date are indispensable.

This simplification leads to doing away with the fields tdl and dm in the memory MCO and the field tdle in the memory MT. Furthermore, the condition tde=tdl is replaced by the condition N=0.

If N=0, the platters are brought up to date in all cases. Furthermore on reception of the incoming cell, this latter is taken into account and N takes the value N=1. On re-emission of outgoing cell or bringing up to date by the central unit UC, N takes the value 0. All the values are positioned as in column 1 of FIGS. 7 to 9 except that the field a3 does not exist.

If N is different from 0 and t is higher than tde an incoming cell is taken into account with the value (N+1) in the field ab. An outgoing cell is taken into account with the value (N−1) in the field ab. The bringing up to date by the central unit does not modify anything.

If t is lower than tde there is bringing to the time.

On initialisation by the central unit UC, the fields tde, Rm, tdl and dm are positioned at 0, then the zones corresponding to the virtual circuits selected to convey the communications are progressively initialised, first of all the fields pm and dm then the fields tde and tdl by setting to the time.

It is also to be noted that if the buffer memory MT overflows one will have an absence of free address in the memory MAD and the incoming cell will be rejected.

We claim:

1. A method of controlling the flow of cells in an asynchronous time-division communication system by forming cells received from an in-coming asynchronous time-division multiplex system (XE) into cells delivered to an out-going asynchronous time-division multiplex system (XS), said method comprising the steps of:

storing each received in-coming cell in a buffer memory (MT) and at an address (Add) that corresponds to a real time (t) for re-sending the stored cell over an out-going time-division multiplex system (XS);

comparing a first number of cells (N) of a particular communication with are already stored in said buffer memory (MT) and that have not been re-sent at the time when the next cells relating to the particular communication arrive with a maximal number (NM) which is assigned to the particular communication; and denying a re-sending of said next in-coming cell if the comparison finds that the first number exceeds the maximal number.

2. The method according to claim 1 further comprising:

a status memory (MCO) and an arithmetic and logic unit (UAL), the status memory (MCO) being divided into a plurality of zones, each zone bi-univocally corresponding to a communication received over in-coming asynchronous time-division multiplex (XE) and comprising two sections (N and NM);

the further steps comprising:

storing in a first section (N) a number indicating the number of cells of the communication that are stored in the buffer memory (MT) and that have not yet been seen at the time of arrival of the next in-coming cell of the same communication;

a storing in second section (NM) said maximal number assigned to the communication;

using the arithmetic and logic unit (UAL) for making the comparison between the first number (N) and the second number (NM); and inhibiting the re-sending of the in-coming cell, when the first number (N) exceeds the second number (NM).

* * * * *